(12) United States Patent
Choi

(10) Patent No.: US 12,230,942 B2
(45) Date of Patent: Feb. 18, 2025

(54) DEVICE FOR LIFTING POWER EQUIPMENT OF SWITCHBOARD

(71) Applicant: LS ELECTRIC CO., LTD., Anyang-si (KR)

(72) Inventor: E Jae Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/640,640

(22) PCT Filed: Mar. 12, 2020

(86) PCT No.: PCT/KR2020/003440
§ 371 (c)(1),
(2) Date: Nov. 1, 2022

(87) PCT Pub. No.: WO2021/045338
PCT Pub. Date: Mar. 11, 2021

(65) Prior Publication Data
US 2024/0250510 A1    Jul. 25, 2024

(30) Foreign Application Priority Data

Sep. 6, 2019    (KR) .......................... 10-2019-0110557

(51) Int. Cl.
*H02B 11/12*    (2006.01)
*B66C 1/66*    (2006.01)
*B66C 23/20*    (2006.01)

(52) U.S. Cl.
CPC ................ *H02B 11/12* (2013.01); *B66C 1/66* (2013.01); *B66C 23/20* (2013.01)

(58) Field of Classification Search
CPC ......... H02B 11/12; H02B 11/127; B66C 1/66; B66C 17/06
See application file for complete search history.

(56) References Cited

U.S. PATENT DOCUMENTS 1,928,420 A * 9/1933 Graves, Jr. ............... H02B 1/36
361/607
3,572,513 A * 3/1971 Tantlinger ............. B60P 1/5442
212/73

(Continued)

FOREIGN PATENT DOCUMENTS

CN        203976211 U     12/2014
CN        205087802 U     3/2016
(Continued)

OTHER PUBLICATIONS

Notice of Allowance for related Chinese Application No. 202080062290. 6; action dated Jul. 12, 2024; (7 pages).

(Continued)

*Primary Examiner* — Sang K Kim
*Assistant Examiner* — Nathaniel L Adams
(74) *Attorney, Agent, or Firm* — K&L Gates LLP

(57) ABSTRACT

The present invention relates to a device for lifting a circuit breaker of a switchgear, the device comprising: a rail part that is located above the switchgear and has a plurality of vertically arranged compartments; an elevating part that can be guided and move above the rail part, and lifts the circuit breaker; and a lifting bracket that is fixed to two facing side surfaces of the circuit breaker, is coupled to a hook block of the elevating part, and moves up and down according to the actions of the elevating part.

4 Claims, 8 Drawing Sheets

(56) References Cited

U.S. PATENT DOCUMENTS

| | | | | | |
|---|---|---|---|---|---|
| 4,126,232 | A | * | 11/1978 | Orawiec | H02B 3/00 |
| | | | | | 212/312 |
| 5,324,088 | A | * | 6/1994 | Iio | B66C 1/14 |
| | | | | | 294/82.17 |
| 6,041,949 | A | * | 3/2000 | Walker | H02B 3/00 |
| | | | | | 212/331 |
| 9,156,614 | B2 | * | 10/2015 | Ono | H02B 3/00 |
| 2010/0148528 | A1 | * | 6/2010 | Emond | B66C 1/625 |
| | | | | | 294/67.33 |

FOREIGN PATENT DOCUMENTS

| | | | | | |
|---|---|---|---|---|---|
| CN | 105836607 | A | * | 8/2016 | B66C 1/22 |
| JP | 2007312452 | A | | 11/2007 | |
| JP | 2010130858 | A | | 6/2010 | |
| KR | 101090186 | B1 | | 12/2011 | |
| KR | 20140029299 | A | | 3/2014 | |
| KR | 20140101950 | A | | 8/2014 | |

OTHER PUBLICATIONS

International Search Report for related International Application No. PCT/KR2020/003440; report dated Mar. 11, 2021; (6 pages).
Written Opinion for related International Application No. PCT/KR2020/003440; report dated Mar. 11, 2021; (5 pages).
Office Action for related Chinese Application No. 202080062290.6; action dated Mar. 5, 2024; (8 pages).

* cited by examiner

DEVICE FOR LIFTING POWER EQUIPMENT OF SWITCHBOARD

CROSS-REFERENCE TO RELATED APPLICATION

The present application is a National Stage of International Application No. PCT/KR2020/003440 filed on Mar. 12, 2020, which claims priority to and the benefit of Korean Patent Application No. 10-2019-0110557, filed on Sep. 6, 2019, the disclosure of which is incorporated herein by reference in its entirety.

FIELD

The present disclosure relates to a device for lifting power equipment of a switchboard, and more particularly, to a lifting device capable of preventing safety accidents such as overturning.

BACKGROUND

In general, power distribution facilities are an important element of excellent power system design. Among them, the selection of a switchgear and a switchboard should be selected through various considerations for the power system.

The switchgear is based on ANSI standard C37.20.1, UL standard 1558 and NEMA standard SG-5, and uses a circuit breaker housing high voltage wiring, switchgear, protection relay and the like together in a metal box.

According to UL standard 1558, it is configured up to four stages of loading in one section in a configuration in which the circuit breaker, which is the metal box, is stacked in multiple stages in the vertical direction. Therefore, the compartment accommodating the uppermost circuit breaker has a high height, so the circuit breaker must be lifted and loaded into the compartment.

Conventionally, various lifters are used to load a circuit breaker on a switchboard having a compartment according to UL standard 1558, and examples of these lifters are as follows.

FIG. 1 is a configuration diagram of a method using a conventional trolley lifter, FIG. 2 is an explanatory diagram showing a state in which a circuit breaker is loaded on a pedestal of the trolley lifter, and FIG. 3 is a mimetic diagram of a process of raising a circuit breaker using the trolley lifter.

Referring to FIGS. 1 to 3, conventionally, a box-type circuit breaker 300 may be loaded on a switchboard 200 using a trolley lifter 100.

As mentioned above, in one section of the switchboard 200, four compartments 210, 220, 230, 240 are provided up and down, and a trolley lifter 100 including a liftable pedestal 110 and movable wheels 120 may be used in order to load the circuit breaker 300, which is a heavy object, in the uppermost compartment 240.

In order for the operator to load the circuit breaker 300 in the uppermost compartment 240, as shown in FIG. 2, in a state in which the pedestal 110 of the trolley lifter 100 is moved to the lowest position, the circuit breaker 300, which is a heavy object, should be placed on the pedestal 110 by manpower.

In this case, there is a possibility that a safety accident may occur.

Then, using the wheels 120, the trolley lift device 100 on which the circuit breaker 300 is mounted is moved to the switchboard 200 side, and in order to load the circuit breaker 300 in the uppermost compartment 240, the pedestal 110 on which the circuit breaker 300 is placed is moved upward.

At this time, the pedestal 110 is raised and lowered by a chain or a hydraulic jack, and at this time, the wheels 120 are fixed by locking them to prevent a safety accident from occurring.

Then, when the pedestal 110 is raised and the circuit breaker 300 is positioned in front of the uppermost compartment 240, the circuit breaker 300 is loaded into the compartment 240.

In this case, the loading method may be a method of releasing the lock, pushing the trolley lifter 100 toward the switchboard 200 until the circuit breaker 300 is very close to the compartment 240, and then pushing it in by manpower.

However, it is not easy to load the circuit breaker 300, which is a heavy object, into the compartment 240 at a relatively high place, and also, there is a risk that the trolley lifter 100 may be overturned while the circuit breaker 300, which is a heavy object, is eccentrically positioned on one side of the trolley lifter 100.

As such, since the circuit breaker lifting using the conventional trolley lift device 100 requires an operator to intervene and use manpower, there is a risk of safety accidents due to the characteristics of handling heavy objects and there is a risk of overturning.

FIG. 4 is a configuration diagram showing an example of lifting a circuit breaker using a conventional crane, and FIG. 5 is an explanatory diagram showing a lifting process using FIG. 4.

Referring to FIGS. 4 and 5, the crane 400 may be installed on the indoor ceiling of an electric room, and the circuit breaker 300, which is a heavy object, may be lifted and moved by using a hook block 420 that is lifted by a hoist 410.

In fact, a plurality of rails of a bridge crane, and a trolley that can move along a rail and supports a hoist, etc., although it has a complicated configuration, the configuration is simplified and illustrated in FIGS. 4 and 5.

The operator operates the hoist 410 of the crane 400 by operating the remote controller (or pendant) to move the hook block 420 downward.

Next, the operator hangs and fixes the circuit breaker 300, which is a metal box, to the hook block 420.

In this case, used is a method of hanging a separate rope 310 on the hook block 420 in a state in which the rope 310 is fixed to the circuit breaker for fixing the circuit breaker 300 to the hook block 420.

Next, by moving the hook block 420 upward again, the circuit breaker 300 is positioned in front of the uppermost compartment 240.

In this state, the hoist 410 may be moved along the rail, and the circuit breaker 300 may be loaded in the compartment 240.

The method using the crane can reduce the intervention of manpower compared to the method using the trolley lift described above, but there is a possibility that the circuit breaker 300 may collide with the switchboard 200 due to inexperienced operation or shaking of the wire rope, and in case of impact, there is a risk that the circuit breaker 300 may fall and cause a safety accident.

In particular, since a rope 310 having a predetermined length should be applied to fix the circuit breaker 300 to the hook block 420, shaking may occur in the connection portion of the rope 310 and the hook block 420, and thus this further increases the risk of collision or falling.

In addition, since the length is unnecessarily increased by the use of the rope 310, the shaking may occur more significantly.

In addition, the crane is not easy to install because the installation cost is very high, and if installed, it may lead to an increase in cost, and in fact, there are more cases where the crane is not installed in the electric room.

Due to the problems of the prior art, there is a need for a device for lifting a circuit breaker that is safer and can minimize the increase in cost in the current market.

SUMMARY

The present disclosure is directed to providing a device for lifting power equipment capable of effectively lifting power equipment and loading it in a switchboard compartment while minimizing cost input.

In particular, the present disclosure is directed to providing a device for lifting power equipment capable of preventing a safety accident or damage to the power equipment or the switchboard by preventing the power equipment from shaking during lifting.

A device for lifting power equipment of a switchboard of the present disclosure includes a rail part that is located above the switchboard; an elevating part that can be guided and move forward and backward and left and right above the rail part, and lifts the power equipment; and a lifting bracket that is fixed to two facing side surfaces of the power equipment, is coupled to a hook block of the elevating part, and moves up and down according to the actions of the elevating part.

In an embodiment of the present disclosure, the rail part may include a first guide installed long in a left and right width direction from an upper portion of the switchboard; and a second guide positioned in an orthogonal direction from the upper side of the first guide, capable of being moved by being guided by the first guide, and guiding the elevating part to move in the front and rear direction of the switchboard, wherein the second guide may be configured to protrude toward the front of the switchboard, or have a multi-structure, so that when extended, a part of the second guide may protrude toward the front of the switchboard.

In an embodiment of the present disclosure, the switchboard is a multisection switchboard in which one section including compartments arranged up and down in one row is arranged in a plurality of left and right, and the first guide is positioned over the entire upper portion of the plurality of sections, so that at least one elevating part can lift the power equipment to the compartments of all sections.

In an embodiment of the present disclosure, the lifting bracket may include a frame part providing a circular ring coupled to the hook block; and a hanging part having one side coupled to the frame part and the other side inserted into each groove of two facing side surfaces of the power equipment.

In an embodiment of the present disclosure, the frame part may include an upper frame part in the form of a long bar in one direction; and a side frame part extending downward from two facing sides of the upper frame part.

In an embodiment of the present disclosure, adjusting holes into which opposite ends of the hanging bar coupled to one end of the hanging part are inserted may be formed in the side frame part, and insertion grooves for adjusting the spacing into which a part of the hanging bar is inserted may be formed in the adjustment hole.

In an embodiment of the present disclosure, the hanging part may include an insertion part having a lower end bent upward and inserted into a groove provided on two facing side surfaces of the power equipment.

In an embodiment of the present disclosure, the hanging part may include an insertion part having a lower end bent upward and inserted into a groove provided on two facing side surfaces of the power equipment.

In an embodiment of the present disclosure, the hanging part may be connected to the hanging bar by a link.

In an embodiment of the present disclosure, the present disclosure may further include a movement restricting part that rotates around a pivot fixed to the side frame part and has a plurality of grooves for restricting movement of the hanging bar in a closed state.

In an embodiment of the present disclosure, the movement restricting part may further include an insertion groove into which a fixing pin fixed to the side frame part opposite to the pivot is inserted with the adjustment hole therebetween.

The present disclosure provides a device for lifting that is movable so as to protrude from the upper end of the switchboard to the front side of the switchboard, thereby minimizing the cost while stably lifting the power equipment.

In addition, the present disclosure provides a bracket for connecting power equipment to the hook block to reduce shaking compared to a method using a conventional rope, thus capable of securing stability and reducing the risk of damage due to a fall accident and collision.

DESCRIPTION OF SYMBOLS

10: elevating part 20: rail part
30: lifting bracket 40: power equipment
50: switchboard

DETAILED DESCRIPTION

Hereinafter, in order to fully understand the configuration and effects of the present disclosure, preferred embodiments of the present disclosure will be described with reference to the accompanying drawings. However, the present disclosure is not limited to the embodiments disclosed below, and may be embodied in various forms and various modifications may be made. Rather, the description of the present disclosure is provided so that this disclosure will be thorough and complete and will fully convey the concept of the disclosure to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present disclosure, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present disclosure may be interpreted as meanings commonly known to those of ordinary skill in the art.

Hereinafter, a device for lifting power equipment of a switchboard according to an embodiment of the present disclosure will be described in detail with reference to the drawings.

Figure 1:
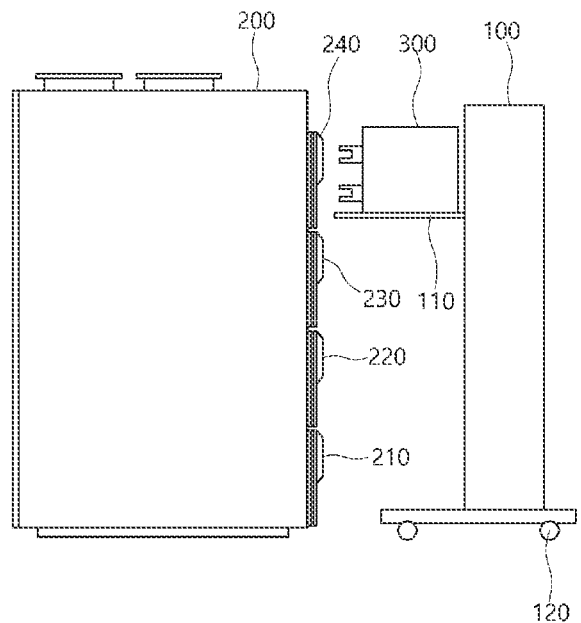
FIG. 1 is a configuration diagram of a device for lifting a circuit breaker using a conventional trolley lifter.
Figure 2:
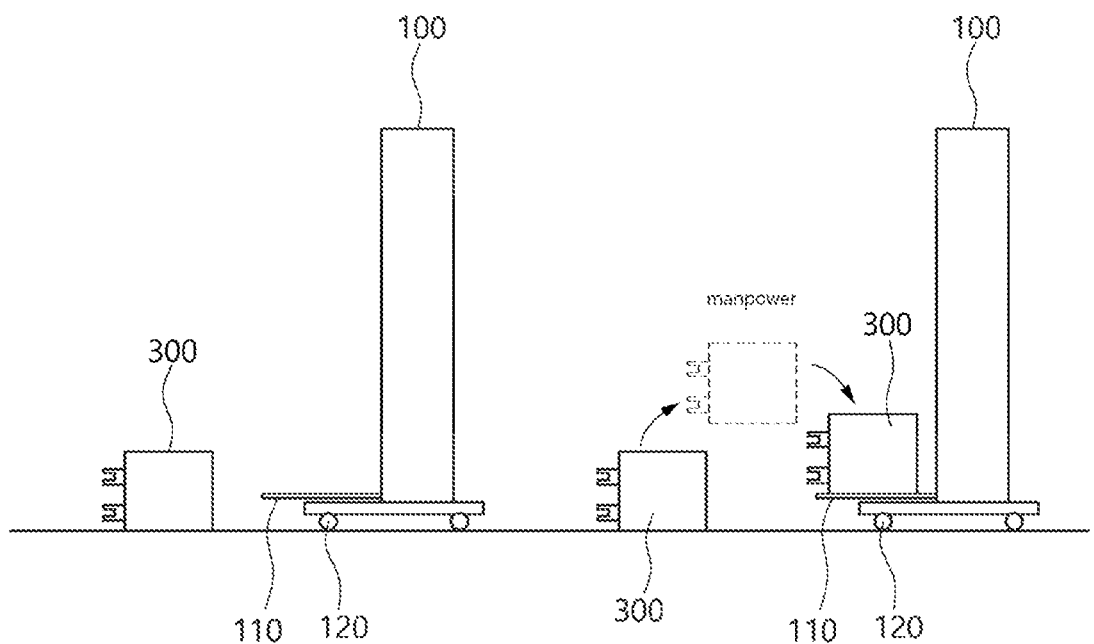
FIG. 2 is an explanatory diagram showing a state in which a circuit breaker is loaded on a pedestal of the trolley lifter of FIG. 1.
Figure 3:
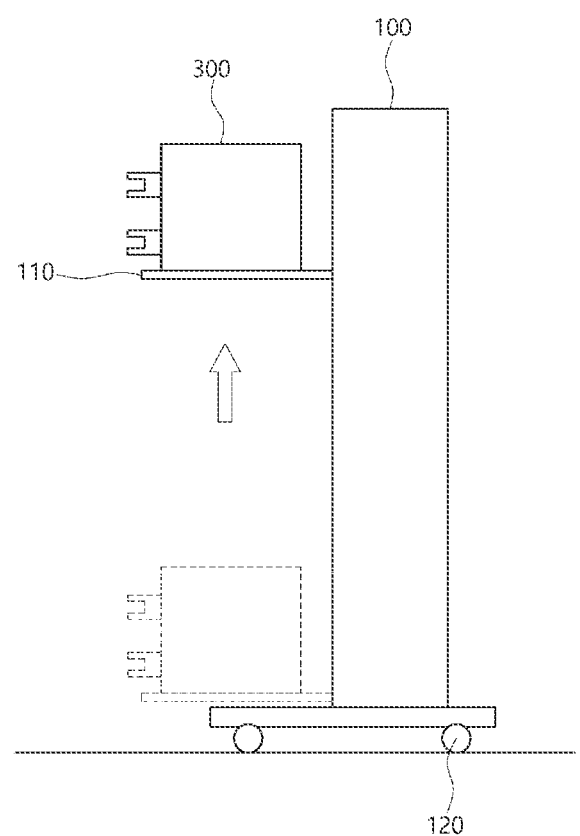
FIG. 3 is a mimetic diagram of a process of raising a circuit breaker using the trolley lifter of FIG. 1.
Figure 4:
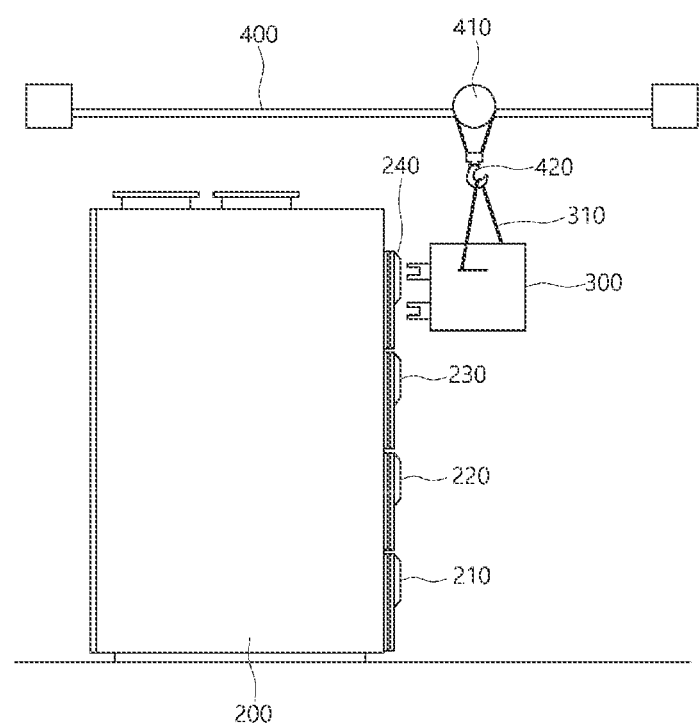
FIG. 4 is a configuration diagram of a device for lifting a circuit breaker using a conventional bridge crane.
Figure 5:
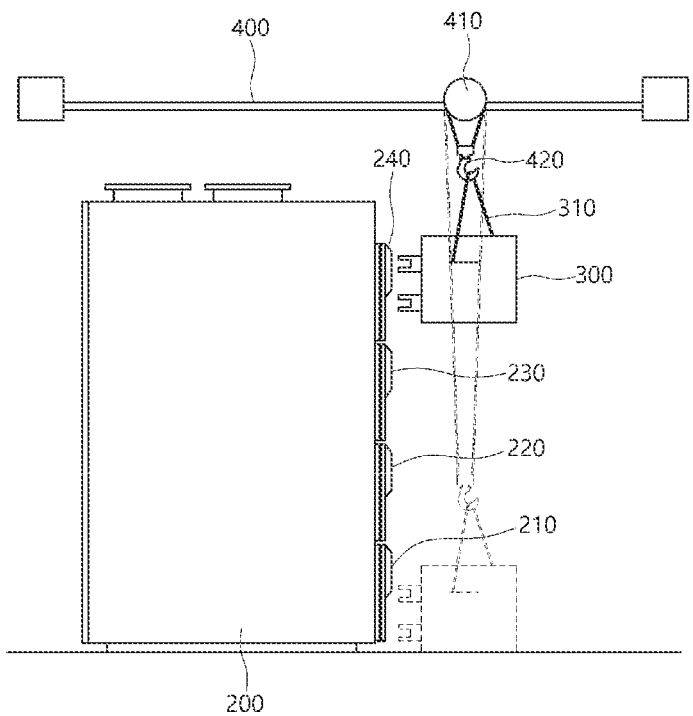
FIG. 5 is an explanatory diagram showing a lifting process using FIG. 4.
Figure 6:
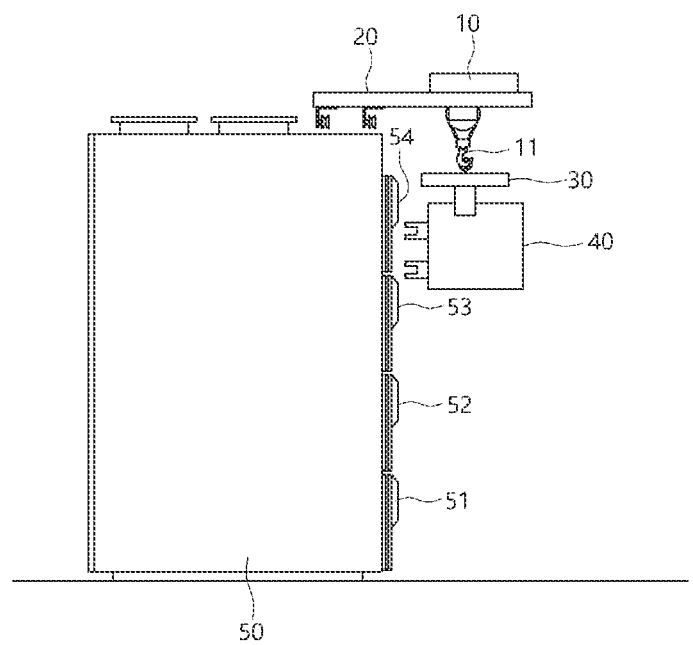
FIG. 6 is a configuration diagram of a device for lifting power equipment of a switchboard according to a preferred embodiment of the present disclosure.
Figure 7:
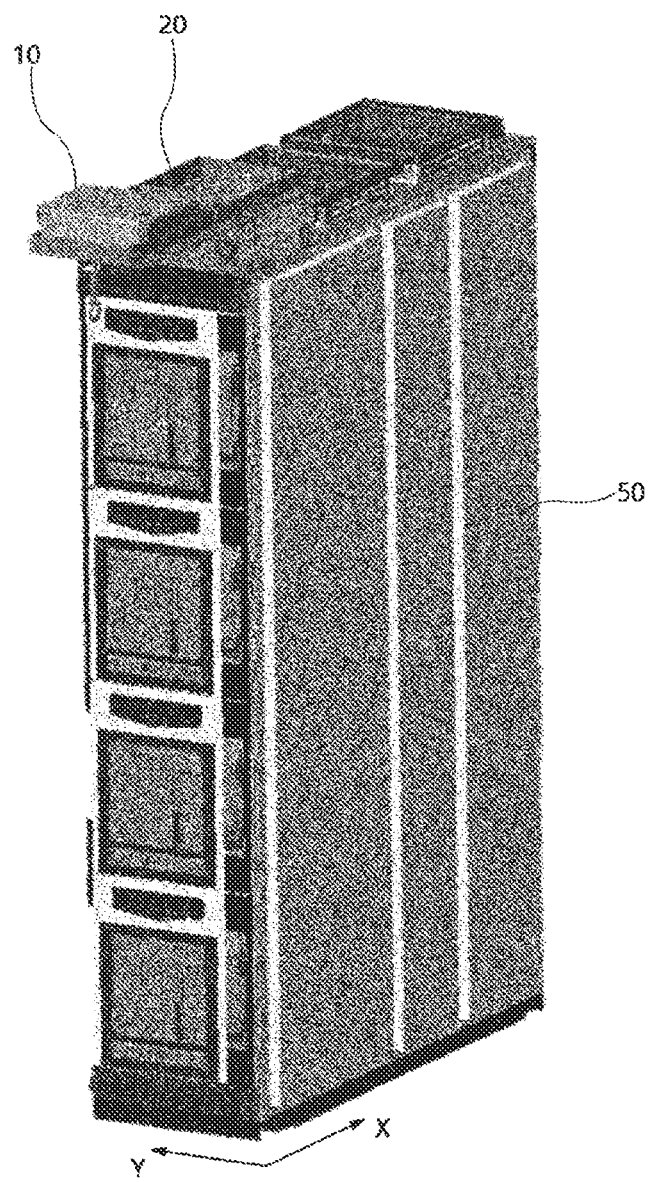
FIG. 7 is a perspective view of a switchboard in a state in which the present disclosure is installed.

FIG. 6 is a configuration diagram of a device for lifting power equipment of a switchboard according to a preferred embodiment of the present disclosure, and FIG. 7 is a perspective view of a switchboard in a state in which the present disclosure is installed.

Referring to FIGS. 6 and 7, respectively, the device for lifting power equipment of a switchboard according to a preferred embodiment of the present disclosure includes a rail part 20 installed on an upper surface of a switchboard 50 and partially protruding to the front of the switchboard 50 if necessary; an elevating part 10 movable along the rail part 20 and capable of moving the hook block 11 up and down in a state protruding toward the front of the switchboard 50; and a lifting bracket 30 fixed to the grooves on opposite sides of the power equipment 40, coupled to the hook block 11 of the elevating part 10, and moving together with the hook block 11 to lift the power equipment 40.

Hereinafter, the device for lifting power equipment of a switchboard according to one embodiment of the present disclosure constructed as above will be described in detail.

First, the device for lifting power equipment of the present disclosure is to be installed on the upper surface of the switchboard 50 in order to secure safety such as fall prevention and to minimize costs.

FIG. 7 shows a switchboard 50 corresponding to one section, and power equipment 40 may be lifted and loaded in each compartment of a plurality of sections by applying one elevating part 10 to the switchboards 50 of a plurality of sections. Such features will be described later in more detail.

The power equipment 40 may be a circuit breaker.

If the rail part 20 installed on the upper surface of the switchboard 50 has a structure that can move the elevating part 10 in the x-axis and y-axis directions, it can be applied to the present disclosure regardless of the structure.

The x-axis movement of the elevating part 10 allows the power equipment 40 to be moved closer to the compartment after lifting it, and is to ensure stability by positioning the elevating part 10 on the upper side of the switchboard 50 when the elevating part 10 is not used.

In addition, when the switchboard 50 of FIG. 7 has a structure having multiple sections disposed in plurality in contact with the left or right side, the y-axis movement is to load the power equipment 40 in the compartments located in all sections using one elevating part 10.

Figure 8:
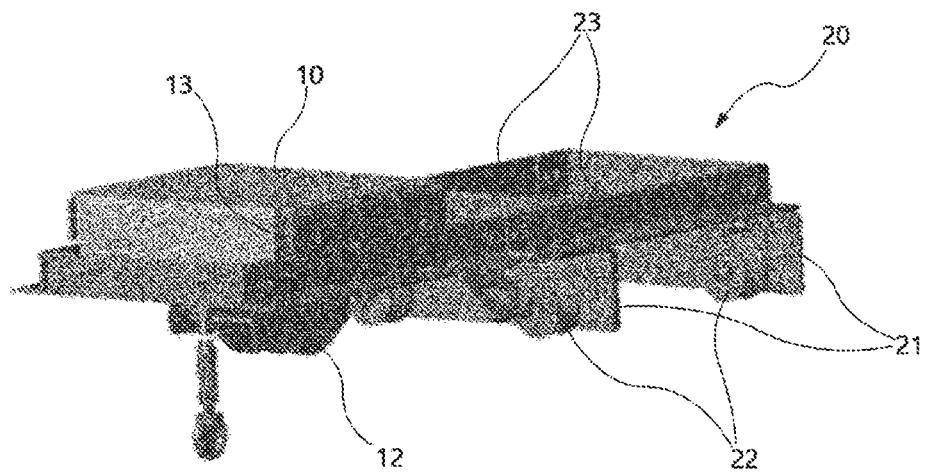
FIG. 8 is a configuration diagram of one embodiment of a rail part applied to the present disclosure.

FIG. 8 is a configuration diagram of one embodiment of a rail part 20 applied to the present disclosure.

Referring to FIG. 8, the rail part 20 may include a pair of first guides 21 elongated in the y-axis direction; a first roller 22 provided on a side surface of the first guide 21; and a pair of second guides 23 located on the upper side of the first guide 21, movable in the y-axis direction according to the rotation of the first roller 22, and elongated in the x-axis direction.

In the above embodiment, a driving means such as a motor and a power transmission means such as a belt or a gear for transmitting the driving force of the driving means to the first roller 22 are omitted, and the omitted configurations may be by those of ordinary skill in the art to which the present disclosure pertains.

In the above embodiment, the first roller 22 is shown, and the configuration in which the second guide 23 moves along the y-axis direction by the rotation of the first roller 22 has been described, but the first roller 22 may be formed on the second guide 23 instead of on the first guide 21.

This means that the rail part 20 can be configured in various shapes, and as long as the rail part 20 of the present disclosure has a structure that guides the elevating part 10 to move freely in the x-axis and y-axis directions with respect to the ground, precisely in the front-rear direction and left and right side directions of the switchboard 50, it can be applied to the present disclosure.

The elevating part 10 may move up and down the hook block 11 described above, including a hoist 12, and a second roller 13 may be provided on the side surface so as to be in contact with the second guide 23 and be moved in the front-rear direction of the switchboard 50 in the x-axis direction along the second guide 23.

In the above example, although the second guide 23 is shown as having a single configuration, the guide itself may be designed in a dual structure that can be extended and shortened and may be configured that the elevating part 10 may be positioned on the upper portion of the switchboard 50 when the guide is shortened, and the elevating part 10 may protrude toward the front side of the switchboard 50 when the guide is extended.

In this case, a housing for accommodating the shortened second guide 23 may be further included, and the housing may be configured to have a door that can be opened and closed to open the door and protrude the elevating part 10 when the second guide 23 is extended.

By using the rail part 20 that can be subjected to various modifications as described above, it is possible to lift and load the power equipment 40 in all the compartments of one section (including compartments arranged up to 4 above and below) by making it possible to move the elevating part 10 to the front and rear sides of the switchboard 50.

In addition, by applying to the switchboard 50 having a plurality of sections, and by allowing at least one elevating part 10 to move left and right of a switchgear 50, it is possible to lift and load the power equipment 40 in the compartments of all sections.

In this configuration, compared to using a conventional trolley lifter, the input of manpower of the operator is significantly reduced, and safety can be secured by preventing the risk of overturning.

In addition, there is a feature that can significantly reduce the installation cost compared to the conventional method using a bridge crane.

Compared to the above method using the conventional bridge crane, it is also possible to prevent the shaking of the power equipment 40 to be lifted, and the feature capable of preventing such shaking is due to the characteristic structure of the lifting bracket 30.

Figure 9:
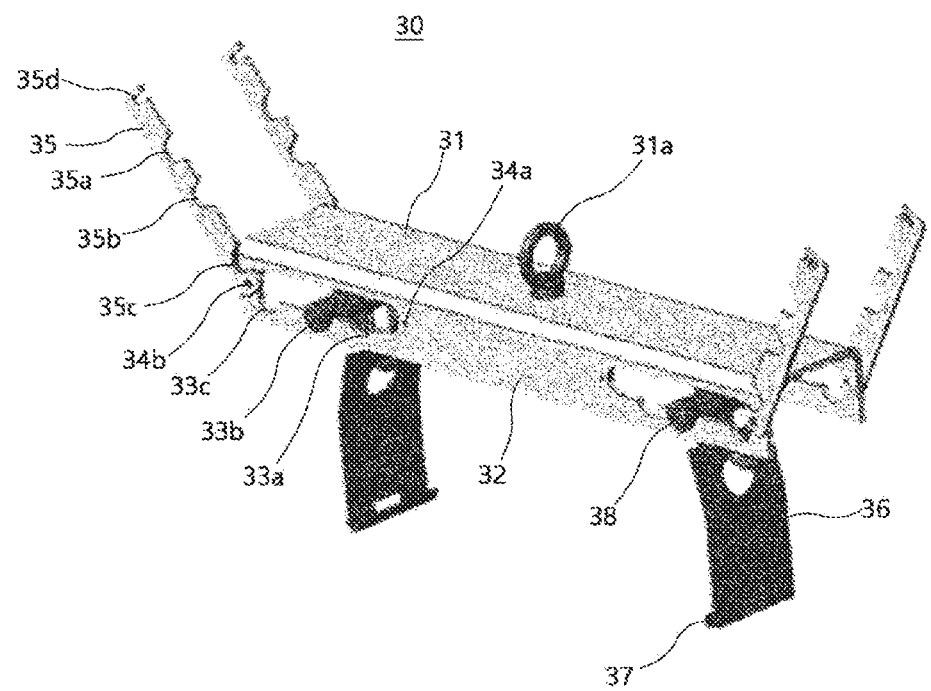
FIG. 9 is a perspective view of an unfolded state of a lifting bracket applied to the present disclosure.

FIG. 9 is a perspective view of an unfolded state of a lifting bracket 30 applied to the present disclosure.

Referring to FIG. 9, the lifting bracket 30 provides a position-variable hanging part 36 to be suitable for lifting power equipment 40 of various sizes, and since it uses a frame structure including an upper frame part 31 and a side frame part 32 by hanging it directly on the hook block 11, compared to the structure using a rope in the conventional bridge crane method, it can improve shaking and has a feature that can eliminate the risk of falling of the power equipment 40 being lifted.

More specifically, the upper frame part 31 of the lifting bracket 30 has a long bar shape on one side, and on the two long sides thereof facing each other, the side frame part 32 is positioned bent downward.

The upper frame part 31 and the lower frame part 32 may be integrally formed, or may be combined after separate formation.

A circular ring 31a capable of hanging and fixing the hook block 11 is provided at the position of the center of gravity of the upper surface of the upper frame part 31.

The side frame parts 32 have an adjustment hole 33 in the form of a long hole for fixing a pair of hanging parts 36 and adjusting the distance between the pair of hanging parts 36 as needed.

The shape of the adjustment hole 33 is closely related to the structure of the hanging part 36, and the shape of the hanging part 36 will be first described before the description of the shape of the adjustment hole 33.

The hanging part 36 has a plate-shaped structure, and a hanging bar 38 is coupled to one end thereof, and the other end thereof is bent upward in a direction in contact with the side surface of the power equipment 40 to form an insertion part 37.

The power equipment 40 in the form of a metal box has grooves formed on two facing side surfaces according to the standard, and the insertion part 37 is inserted into the grooves.

The length of the hanging bar 38 is longer than the distance between the two side frame parts 32, and thus opposite ends of the hanging bar 38 are respectively inserted into the adjustment holes 33 formed to face the two side frame parts 32 to fix the hanging part 36 having the insertion part 37 at the ends.

The adjustment hole 33 has semicircular insertion grooves 33a, 33b, and 33c into which a part of the hanging bar 38 is inserted, each formed at different positions.

Therefore, by inserting each of opposite ends of the hanging bar 38 into the insertion groove selected among the insertion grooves 33a, 33b, 33c, the distance between the two hanging bars 38 can be adjusted, and finally, the distance between the insertion part 37 which is the end of the hanging part 36 can be adjusted.

In this way, by adjusting the spacing of the insertion parts 37, the power equipments 40 having different sizes determined by the standard can be lifted using a single lifting bracket 30.

The lifting bracket 30 has a movement preventing part 35 that blocks the movement of the hanging bar 38 inserted into a specific insertion groove in order to secure safety during the lifting of the power equipment 40.

Two movement preventing parts 35 are provided for each side frame part 32, and have a bar shape with one end rotatably fixed to the side frame part 32 by a pivot 34b.

The pivot 34b is positioned between opposite ends of the side frame part 32 and the adjustment hole 33.

One end of the movement preventing part 35 includes insertion grooves 35a, 35b, 35c corresponding to the positions of the insertion grooves 33a, 33b, 33c provided in the adjustment hole 33, and in a state in which the movement preventing part 35 is rotated so as to be in contact with the side of the side frame part 32, the upper sides of opposite ends of the hanging bar 38 are inserted into one of the insertion grooves 35a, 35b, and 35c, so that the movement of the hanging bar 38 is restricted.

In this case, a fixing pin 34a protrudes between the two adjustment holes 33 formed in each side frame part 32, and an insertion groove 35d into which the fixing pin 34a is inserted is provided in the movement preventing part 35.

In this way, the position of the hanging part 36 of which the distance adjustment is completed is fixed by using the movement preventing part 35, and a stable lifting can be made possible.

Figure 10:
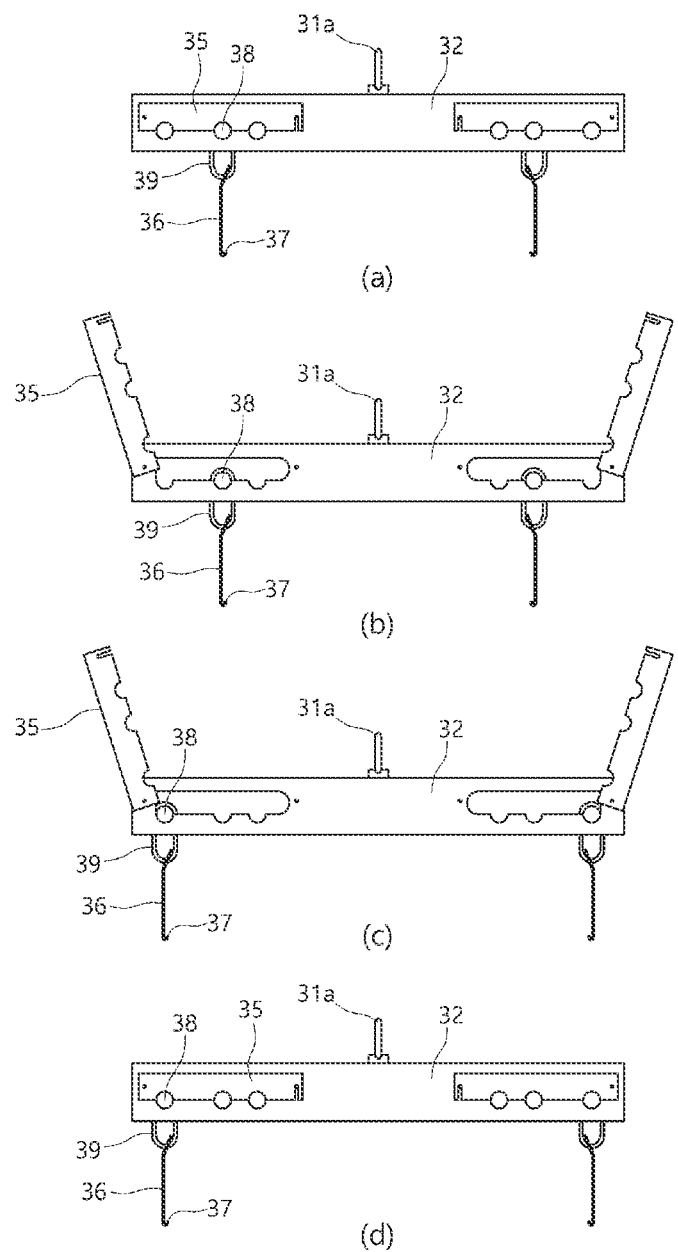
FIG. 10 is a front view showing an example of the use of the lifting bracket in stages.

FIG. 10 is a front view showing an example of the use of the lifting bracket 30 in stages.

(a) of FIG. 10 shows a 'closed state' in which the movement preventing part 35 is located on the side of the side frame part 32. Referring to FIGS. 10 and 9 together, it can be seen that the hanging bar 38 is inserted into the second insertion groove 35b of the adjustment hole 33 in (a) of FIG. 10.

It can be seen that the upper side of the hanging bar 38 is inserted into the second insertion groove 35b of the movement preventing part 35 in the closed state.

In the description with reference to FIG. 9, it has been described that the hanging bar 38 is directly coupled to one end of the hanging part 36, but as shown in FIG. 10, the hanging bar 38 and the hanging part 36 can also be interconnected using a link 39.

In such a state, when it is necessary to further widen the distance between the hanging bars 38 to lift a larger power equipment 40, the operator rotates the movement preventing part 35 around the pivot 34b as shown in (b) of FIG. 10.

At this time, the rotation direction is upward, and the state at this time is defined as an 'open state'.

Then, the operator moves the hanging bar 38 to the last insertion groove 35c of the adjustment hole 33 and inserts it, and moves the hanging part 36 to a position where the largest power equipment 40 can be lifted.

In this way, when the movement preventing part 35 is opened, the position of the hanging bar 38 can be adjusted, and the position of the hanging part 36 can be adjusted according to the size of the power equipment 40 to be lifted.

Next, as shown in (d) of FIG. 10, the movement preventing part 35 is operated in a closed state to prevent the position of the hanging bar 38 from being changed during the lifting process.

Figure 11:
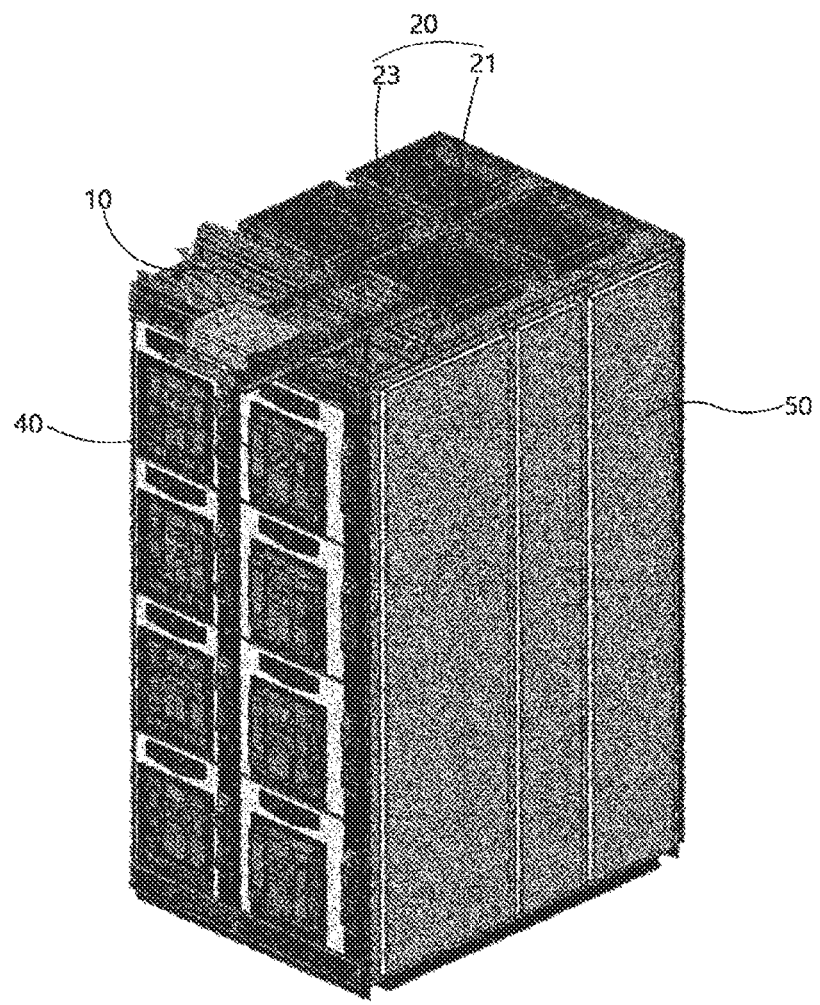
FIG. 11 is a perspective view of an example in which the present disclosure is applied to a switchboard having a plurality of sections.

FIG. 11 is a perspective view of an example in which the present disclosure is applied to a switchboard 50 having two sections, and the first guide 21 is continuously installed on the two sections so that the second guide 23 can move left and right along the first guide 21, and thus it is possible to lift and load the power equipment 40 in both sections using one elevating part 10.

While the present disclosure has been described in connection with what are presently considered to be practical exemplary embodiments, those skilled in the art may understand that the disclosure is not limited to the disclosed embodiments, but, on the contrary, is intended to cover various modifications and equivalent arrangements included within the spirit and scope of the appended claims. Accordingly, the true technical protection scope of the present disclosure shall be determined according to the attached claims.

INDUSTRIAL APPLICABILITY

The present disclosure relates to a device for lifting capable of stably lifting power equipment by changing a mechanical shape, and has industrial applicability.

What is claimed is:

1. A device for lifting power equipment of a switchboard, comprising:
   a rail part that is located above the switchboard; an elevating part that can be guided and move forward and backward and left and right above the rail part, and lifts the power equipment; and
   a lifting bracket that is fixed to two facing side surfaces of the power equipment, is coupled to a hook block of the elevating part, and moves up and down according to actions of the elevating part, wherein the lifting bracket comprises:
      a frame part providing a circular ring coupled to the hook block, wherein the frame part comprises an upper frame part, and a side frame part extending downward from two facing sides of the upper frame part; and
      a hanging part having a first side coupled to the frame part and a second side inserted into each groove of two facing side surfaces of the power equipment, wherein adjusting holes into which opposite ends of the hanging part coupled to one end of the hanging part are inserted are formed in the side frame part and insertion grooves for adjusting a spacing into which a part of the hanging part is inserted are formed in the adjusting holes; and
      a movement restricting part that rotates around a pivot fixed to the side frame part and has a plurality of grooves for restricting movement of the hanging part in a closed state.

2. The device for lifting power equipment of a switchboard of claim 1, wherein the rail part comprises:
   a first guide installed longitudinally in a left and right width direction from an upper portion of the switchboard; and
   a second guide positioned in an orthogonal direction from an upper side of the first guide, capable of being moved by being guided by the first guide, and guiding the elevating part to move in the orthogonal direction of the switchboard,
   wherein the second guide is configured to protrude toward a front of the switchboard, or has a multi-structure, so that when extended, a part of the second guide protrudes toward the front of the switchboard.

3. The device for lifting power equipment of a switchboard of claim 1, wherein the movement restricting part further comprises an insertion groove into which a fixing pin fixed to the side frame part opposite to the pivot is inserted with an adjusting hole of the adjusting holes therebetween.

4. The device for lifting power equipment of a switchboard of claim 1, wherein the hanging part comprises an insertion part having a lower end bent upward and inserted into a groove provided on two facing side surfaces of the power equipment.

* * * * *